Dec. 13, 1938.         J. C. L. LEASON         2,139,963
            FLEXIBLE POWER TRANSMISSION DRIVE
                Filed Nov. 26, 1937         2 Sheets-Sheet 2
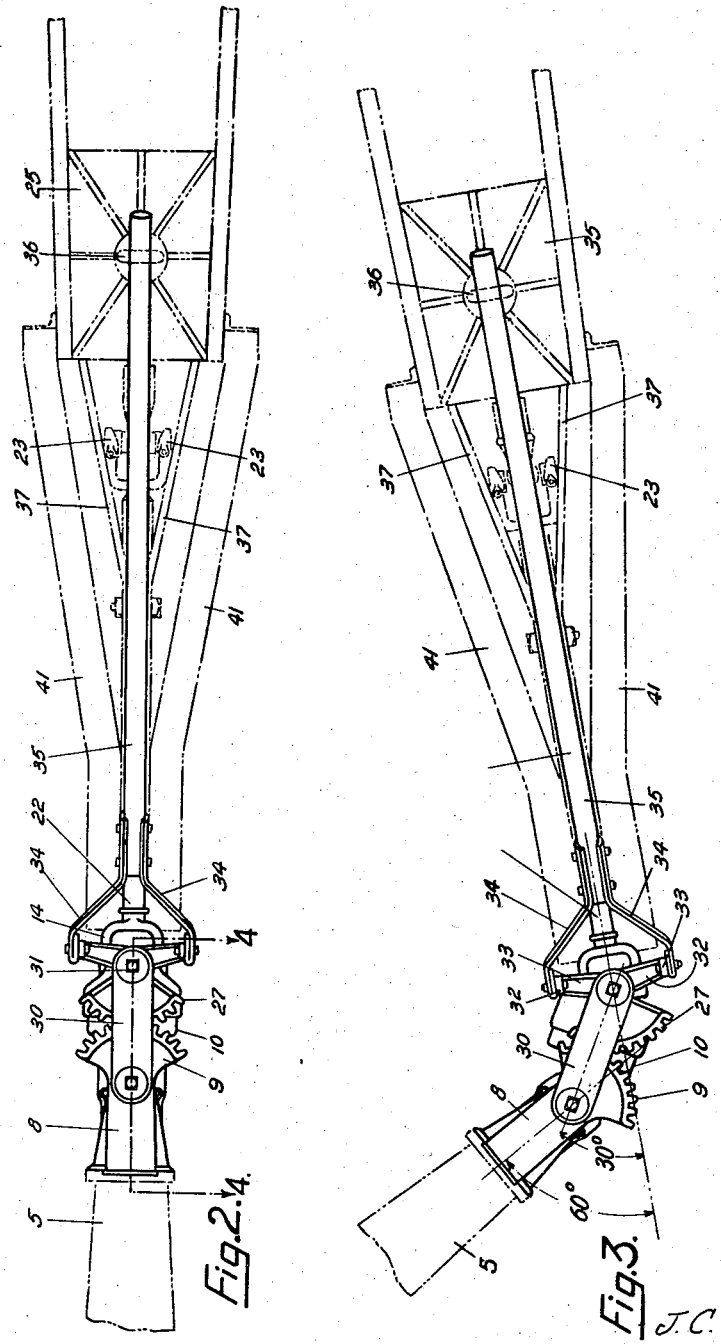
J. C. L. Leason
INVENTOR
By: Glascock Downing & Seebold
Attys.

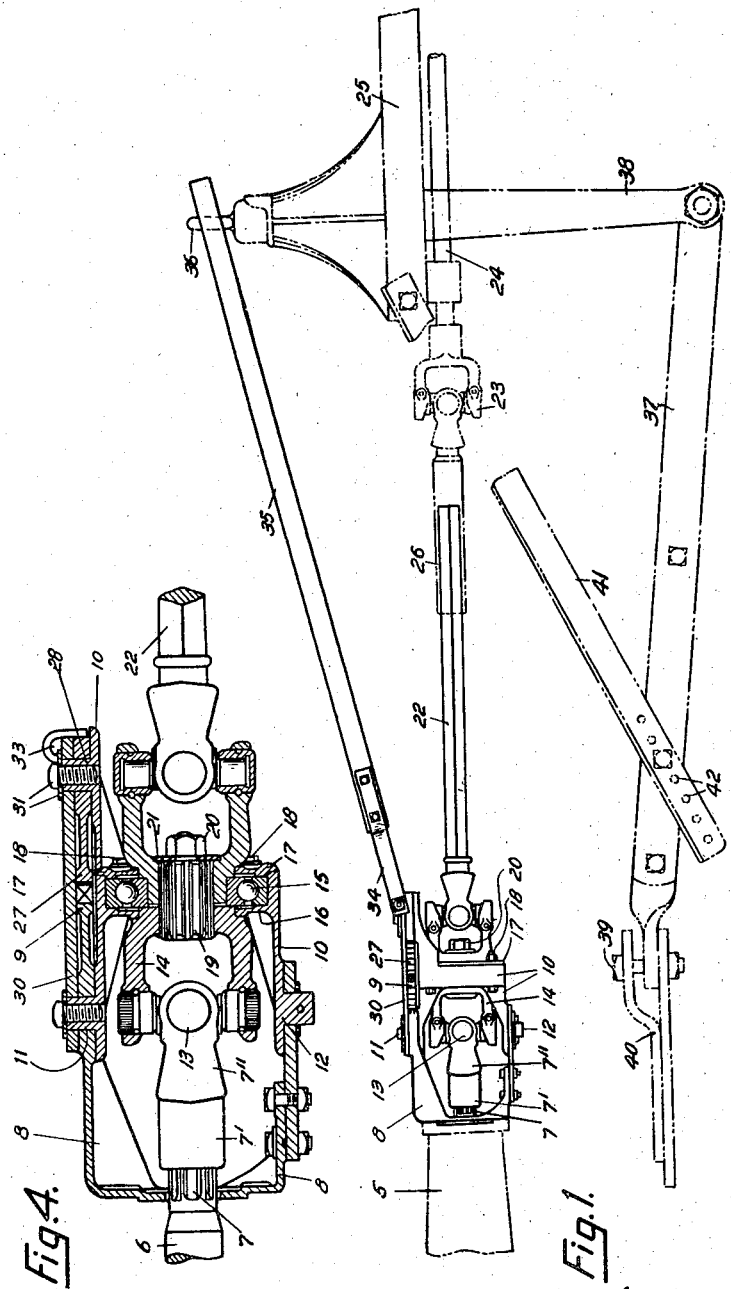

Patented Dec. 13, 1938

2,139,963

UNITED STATES PATENT OFFICE 2,139,963

FLEXIBLE POWER TRANSMISSION DRIVE

James Crothers Leonard Leason, Gardenvale, Victoria, Australia, assignor to H. V. McKay Massey Harris Proprietary Limited, Sunshine, Victoria, Australia, a corporation of Victoria, Australia Application November 26, 1937, Serial No. 176,748
In Australia December 8, 1936

16 Claims. (Cl. 64—21)

This invention relates to improvements in and connected with flexible power transmission drives and refers especially to apparatus for supporting and automatically controlling the movement of the sections of a flexible power transmission shaft embodying a plurality of universal joints and operatively connecting a drive shaft to a driven shaft.

The invention is directed particularly but is not limited to the provision of improvements in that type of coupling means wherein the front end of a harvester or other machine is pivotally supported on the draw bar of a tractor and wherein provision is made for ensuring the transmission of power at an even velocity from a power take off shaft on the tractor to the operative parts of the machine even when the tractor is turning at an angle to the harvesting or other machine.

The object of the invention is to provide simple and durably constructed apparatus for supporting and controlling the angular movements of the sections of the flexible power transmission shaft, whereby when the end sections of the shaft are turning at an angle to each other, the said apparatus will function to automatically adjust the adjacent sections of the shaft so that the angles therebetween will be uniform and the universal joints coupling the same will function freely under all conditions.

I accomplish the abovementioned object by connecting a pair of shafts by a double universal coupling rotatively mounted on a member pivotally supported in alignment with one of the joints of the coupling and with the centre of a fixed toothed sector, pivotally mounting a toothed sector on the member supporting the double universal coupling and arranging it in mesh with the fixed sector, and providing means for constraining the movement of the pivoted sector and member supporting the same upon the angular displacement of the shafts with respect to each other whereby the medial part of the double universal coupling will be displaced to half the extent of the shafts and the angles therebetween will be equal at all points of their movements.

One adaptation of the apparatus comprises a universal coupling connecting a drive shaft to a short shaft having its opposite end connected by a universal coupling to a driven shaft, a toothed sector mounted on a bracket and having its centre located in alignment with the first mentioned coupling, a member rotatively supporting the short shaft and pivotally mounted on the bracket in line with the centre of the fixed sector, a sector pivoted to the member rotatively supporting the short shaft, and a connection between the pivoted sector and the support for the driven shaft, constructed, arranged and operating whereby any lateral displacement of the drive and/or driven shaft will cause the pivoted sector to move over the fixed sector and constrain the movement of the short shaft so that the angles between said short shaft and the drive and driven shafts will be maintained equal at all points of their movements.

A telescopic section can be provided in the length of any of the shafts and the movable sector and the frame supporting the driven shaft will permit the flexible power transmission shaft to readily adjust itself whereby the angles assumed by the adjacent sections thereon in turning will be equal and the universal coupling members will function freely and rotate at constant speeds when the drive shaft is disposed at a right angle to the driven shaft.

When the apparatus is used for operatively coupling a power take off shaft of a tractor to the operative mechanism of a harvester machine, a rigid connecting member on the frame of the said machine extends forwardly therefrom and is pivotally connected to the draw bar of the tractor preferably in vertical alignment with the centre of the medial part of the double universal coupling.

In order that the invention may be readily understood, reference will now be made to the accompanying sheets of explanatory drawings wherein:—

Figure 1 is a view in side elevation showing one embodiment of the invention as employed for transmitting motion from the power take off shaft of a tractor to a shaft for transmitted motion to the operative parts of a harvester. In this view the housing for the power take off shaft, the front part of a harvester frame, and the connection between the said frame and the draw bar of the tractor are shown in broken lines.

Figure 2 is a view in plan of Figure 1.

Figure 3 is a view in plan showing the positions assumed by the parts of the invention when the tractor is disposed at an angle to the machine, as in turning corners.

Figure 4 is a view in longitudinal vertical section taken on the dotted line 4—4 of Figure 2.

In these drawings, the reference numeral 5 designates a housing on a tractor frame for supporting the rear of a power take off shaft 6 having a splined rear end 7 which is slidably engaged by a splined boss 7' on a fork 7" forming part of a double universal coupling. A forked bracket 8 is mounted rigidly on the rear of the tractor in line with the drive shaft and a horizontally disposed semi-circular toothed sector 9 is formed on the upper part of the bracket.

A rearwardly extending frame member 10 is pivoted at 11 and 12 to the upper and lower parts, respectively, of the bracket 8 in vertical alignment with the centre of the fixed sector 9 and with one joint 13 of the double universal coupling 14. The medial part of the double universal coupling is rotatively mounted in a ball bearing 15 supported by the pivoted frame member 10. The ball bearing 15 is mounted between an annular flange 16 on the frame member 10, and an annular ring 17 which is secured to the flange 16 by bolts 18.

The forward fork of the medial part of the double universal joint 14 is welded to a splined stud 19 which is passed through a splined hole formed axially in a boss on the second fork of the said medial part, and the splined stud 19 is provided with a reduced threaded portion to take a nut 20 and washer 21 by means of which both forks of the medial part are secured firmly together.

The object is detachably connecting the two forks on the medial part of the double universal coupling in the manner above described is to enable the parts to be readily assembled within the bearing 15 when the same has been mounted and secured between the flange 16 and the ring 17.

It will be obvious that the medial part of the double universal coupling can be formed in one piece and mounted in a bearing formed in two parts and fitted to the frame member 10 in any approved way.

The rear of the double universal coupling is connected to the forward end of a driven shaft 22 which may be connected by a universal joint 23 to a counter-shaft 24 mounted on the forward part of an implement frame 25 and adapted to impart movement to the operative parts of the said implement through approved gearing.

If desired, a telescopic joint 26 may be provided in the length of the driven shaft 22, as shown in Figure 1 of the drawings. A sector 27 is pivotally mounted on a vertical stud 28 on the forward end of the pivoted frame member 10 and this sector meshes with and is of the same size as the fixed sector 9. A link 30 is located above the sectors and is pivotally mounted at one end on the pivot member 11 and at the opposite end on the stud or pivot 28 of the sector 27 and the said link is retained in position by means of set screws and washers 31 or in any other approved way.

The pivoted point of the sector 27 is provided with laterally projecting arms 32 having upstanding lugs 33 to which are pivotally connected the forked ends 34 of a constraining rod 35 which extends rearwardly and is slidably supported in an eye 36 on the frame of the implement. If preferred, the rear end of the constraining rod 35 can be loosely coupled to the driven shaft 22 whereby it will be retained in alignment therewith when the tractor is turning out of alignment with the machine and will not interfere with the free rotation of the said shaft. If preferred, means other than the constraining rod 35 can be employed for maintaining the pivoted sector 27 in constant relationship with the driven shaft 22.

The rear ends of a pair of forwardly converging bars 37 are connected to a steering fork 38 on the implement frame and the forward ends of the said bars are pivotally connected to a bolt 39 passing vertically through the bifurcated rear end of a draw bar 40 attached to the tractor and preferably in vertical alignment with the power take off shaft. The forwardly converging bars 37 are rigidly braced to the frame of the implement by inclined stays 41 and a series of holes 42 in the said stays enables the said bars to be supported at any desired height to suit the position of the draw bar on the tractor.

Whilst the bearing for rotatively supporting the medial part of the double universal coupling may be located at any point in the length thereof, it is preferably located in alignment with the pitch lines of the teeth of the said pairs of sectors as shown in Figure 4'.

Moreover, the medial part of the double universal coupling may be constructed as an integral unit and be rotatably mounted on the pivoted frame member 10 in any approved way. The splined connection between the rear end of the drive shaft and the splined boss 7', the telescopic connection 26 in the length of the driven shaft permit of these parts to lengthen or shorten when the tractor and machine are taking a turn.

When the tractor is in alignment with the machine drawn thereby, the centres of the toothed portions of the fixed and pivoted sectors are in alignment with the drive and driven shafts, and the constraining rod 25 is arranged in line with the driven shaft or in any other approved way. If preferred, a fixed and movable sector can be located on the underside of the bracket 8 and pivoted frame member 10, and in this case the movably pivoted sectors can be connected to a single constraining rod as 35 or each pivoted sector can be provided with its own constraining rod.

When the tractor is turning at an angle to the machine drawn thereby, the constraining action of the rod 35 connected to the pivoted sector causes the pivoted frame member 10 to be moved through half the angle assumed by the drive shaft 7 on the tractor to the driven shaft 22 coupled to operative parts of the machine.

The positive adjustment of the medial part of the double universal coupling by the constraining means comprising the sectors 9 and 27 and rod 35 causes the said medial part and the drive and driven shafts to be maintained at equal angles throughout any degree of angular displacement of the said shafts and ensures the couplings operating at constant speeds, even when the tractor is turned at right angles to the machine, and all of the parts of the apparatus operating quite freely under heavy loads.

The connections between the ends of the constraining rod 35 and the machine frame and pivoted sector permit of sufficient movement of these parts to compensate for any alteration in the positions of the tractor and machine when passing over undulating ground or the like.

It will be obvious that the invention can be readily adapted to power transmission mechanism employed in various kinds of tractors or other machines and that its use is not restricted to the example above given.

I claim:

1. In a flexible power transmission drive having a drive shaft and a driven shaft connected by a double universal coupling, a pivoted member rotatively supporting the medial part of the double universal coupling, a fixed toothed sector having its centre located in alignment with one of the joints of the double universal coupling, a second toothed sector meshing with the fixed sector and pivotally mounted on the support for the medial part of the coupling, and a constraining member connected to the second sector.

2. A flexible power transmission drive comprising a drive shaft, a driven shaft, a double universal coupling connecting the drive to the driven shaft, a member pivotally supported above one of the joints of the double universal coupling and rotatively supporting the medial part of the said coupling, a fixed sector located above the pivotally supported member, a sector meshing with the fixed sector and pivotally supported on said member, and a constraining rod connected to the pivoted sector.

3. In a flexible power transmission drive having a drive shaft connected by a double universal coupling to a driven shaft, an angularly displaceable member having a bearing rotatively supporting the medial part of the double universal coupling, a sector pivotally mounted on the angularly displaceable member, a fixed sector meshing with the pivoted sector and having its centre located in alignment with a joint of the double universal coupling and with the pivot point of the said member, and a device for constraining the movement of the angularly displaceable member as and for the purpose described.

4. In a flexible power transmission drive having a double universal coupling connecting a drive shaft and a driven shaft, a bracket having a fixed sector thereon, an angularly displaceable frame pivotally supported in line with the centre of the fixed sector and with one joint of the double universal coupling, a bearing on the angularly displaceable member rotatively supporting the medial part of the double universal coupling, a sector pivoted on the angularly displaceable member and meshing with the fixed sector, and a constraining device connecting the movable sector to a member associated with the driven shaft.

5. A flexible power transmission drive comprising angularly movable drive and driven shafts, a double universal coupling connecting the ends of the drive and driven shafts and rotatably supported in a pivoted mounting, a fixed sector extending over the medial part of the double universal coupling and having its centre located in alignment with the pivot of the mounting therefor, a sector pivoted on the mounting for the double universal coupling and meshing with the fixed sector, and a constraining member connected to the pivoted sector.

6. In flexible power transmission drives, a drive shaft connected by a double universal coupling to a driven shaft, a bracket fixed to a mounting for the drive shaft and having a sector thereon, a mounting for the medial part of the double universal coupling pivotally mounted on the bracket at or about the centre of the sector thereon, a sector pivoted to the mounting and meshing with the fixed sector, and a constraining rod connecting the pivoted sector to a part associated with the driven shaft.

7. A flexible power transmission drive according to claim 6 wherein the centre of the fixed sector is in line with or approximately in line with the universal joint connected to the drive shaft, and wherein a link connection is provided between the centres of the intermeshing sectors.

8. A flexible power transmission drive according to claim 6, wherein the fixed and movable intermeshing sectors are of equal size and the medial part of the double universal coupling is located in or approximately in alignment with the pitch lines of the said sectors.

9. A flexible power transmission drive according to claim 6, wherein a telescopic or slidable connection is provided between the double universal joint and the drive shaft, and the bracket supporting the pivotal mounting for the medial part of the double universal joint is disposed in alignment with the said drive shaft.

10. A flexible power transmission drive according to claim 1 wherein a splined member on one fork of the medial part of the universal coupling passes through a splined boss in the second fork of the said medial part, and wherein the two parts are secured together by a nut on a threaded part of the splined member on the first mentioned fork.

11. A flexible power transmission drive according to claim 5 wherein the forks of the medial part of the double universal coupling are detachably connected to each other and are rotatively mounted in a bearing detachably fitted to the pivoted mounting.

12. An apparatus for transmitting motion from a power take off shaft on a tractor to a driven shaft connected to an implement, comprising a bracket fitted to the tractor adjacent to the rear end of the power take off shaft thereon, a double universal coupling connecting the drive shaft to the driven shaft, a fixed sector projecting rearwardly from the bracket, a frame member pivotally mounted on the bracket about the centre of the fixed sector, a bearing on the frame member rotatively supporting the medial part of the double universal coupling, a sector pivotally mounted on the frame member and meshing with the fixed sector, and a constraining rod pivoted at its front end to the movable sector and movably supported at its rear end on the machine.

13. In an apparatus for transmitting motion from a power take off shaft on a tractor to a driven shaft on an implement according to claim 12, a forwardly extending member rigidly mounted on the frame of the implement, a draw bar on the tractor in alignment with the medial part of the double universal coupling and a pivotal connection between the forwardly extending member on the implement frame and the draw bar.

14. An apparatus for transmitting motion according to claim 12, wherein forwardly converging bars are mounted on the frame of the machine and are pivotally connected at their front ends to the draw bar of a tractor, and wherein the said forwardly connecting members are rigidly connected by inclined stays to the frame of the machine.

15. A flexible power transmission drive comprising, a double universal coupling connecting a drive and a driven shaft, a rigid medial part connecting the inner forks of the double universal coupling, a pivotally supported angularly adjustable member having a bearing rotatively supporting the rigid medial part of the double universal coupling, a fixed sector arranged concentrically with the pivot point of the angularly adjustable member, a sector pivotally supported on the angularly adjustable member and meshing with the fixed sector, and a constraining member for controlling the movement of the sector.

16. A flexible power transmission drive comprising, a drive and a driven shaft connected by a double universal coupling, a pivotally mounted angularly adjustable member having a bearing rotatively supporting the medial part of the double universal coupling, a fixed toothed sector having its center located in alignment with one of the joints of the double universal coupling and with the center of the angularly adjustable member, a second toothed sector meshing with the fixed sector and pivotally mounted on the angularly adjustable member, and a constraining member connecting the pivoted sector to a member associated with the driven shaft.

JAMES C. L. LEASON